US009170782B2

(12) United States Patent
Carter et al.

(10) Patent No.: US 9,170,782 B2
(45) Date of Patent: Oct. 27, 2015

(54) EXTENSIBLE MECHANISM FOR PROVIDING SUGGESTIONS IN A SOURCE CODE EDITOR

(75) Inventors: Jonathan P. Carter, Seattle, WA (US); Boris Asipov, Bellevue, WA (US); Fiona Fung, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 174 days.

(21) Appl. No.: 13/430,738

(22) Filed: Mar. 27, 2012

(65) Prior Publication Data

US 2013/0263086 A1 Oct. 3, 2013

(51) Int. Cl.
*G06F 9/44* (2006.01)

(52) U.S. Cl.
CPC ........................................ *G06F 8/33* (2013.01)

(58) Field of Classification Search
CPC .......................................................... G06F 8/33
USPC .......................................................... 717/113
See application file for complete search history.

(56) References Cited

U.S. PATENT DOCUMENTS

| | | | | |
|---|---|---|---|---|
| 6,305,008 | B1 * | 10/2001 | Vaidyanathan et al. ...... | 717/111 |
| 7,562,344 | B1 * | 7/2009 | Allen et al. .................... | 717/113 |
| 8,032,860 | B2 * | 10/2011 | Piehler et al. .................. | 717/110 |
| 8,051,408 | B1 * | 11/2011 | Johnson ......................... | 717/125 |
| 8,321,836 | B2 * | 11/2012 | Meijer et al. ................... | 717/113 |
| 2002/0016953 | A1 * | 2/2002 | Sollich .............................. | 717/1 |
| 2006/0090154 | A1 * | 4/2006 | Bustelo et al. ................. | 717/110 |
| 2008/0244513 | A1 * | 10/2008 | January et al. ................ | 717/113 |
| 2008/0320444 | A1 * | 12/2008 | Meijer et al. .................. | 717/110 |
| 2009/0077535 | A1 * | 3/2009 | Peterson ........................ | 717/113 |
| 2009/0313597 | A1 * | 12/2009 | Rathbone et al. ............. | 717/100 |
| 2010/0192074 | A1 * | 7/2010 | Fung et al. ..................... | 715/763 |
| 2010/0235730 | A1 * | 9/2010 | Campbell et al. ............. | 715/256 |
| 2010/0235812 | A1 * | 9/2010 | Fujii .............................. | 717/120 |
| 2010/0269095 | A1 * | 10/2010 | King et al. ..................... | 717/111 |
| 2010/0287525 | A1 * | 11/2010 | Wagner .......................... | 717/100 |
| 2011/0271250 | A1 * | 11/2011 | Park et al. ...................... | 717/113 |
| 2013/0007699 | A1 * | 1/2013 | Hoban et al. .................. | 717/108 |
| 2013/0263086 | A1 * | 10/2013 | Carter et al. ................... | 717/113 |

OTHER PUBLICATIONS

Writing and Editing Source Code, Applicant Provided Prior Art, IDS Mar. 27, 2012.*
Xcode, Writing and Editing Source Code, Applicant Provided Prior Art, IDS Mar. 27, 2012 (Published Dec. 20, 2011).*

(Continued)

*Primary Examiner* — Don Wong
*Assistant Examiner* — Theodore Hebert
(74) *Attorney, Agent, or Firm* — Kevin Sullivan; Micky Minhas

(57) ABSTRACT

An extensible editor for editing program source code can customize a default display provided by a language service in an IDE. The default display can be modified using source code-specific extension code. The extension code can be provided by a third party. The extension code can reside in the source code file to which it applies. The extension code can reside in a separate file from the file in which the source code resides. A naming convention can be used to enable the extensible editor to locate the extension code. Display entries can be filtered, added, removed, or modified using an API provided by the extensible editor. The API can allow the extension code to register for one or more events including but not limited to a completion hint event, a completion list event, and a function help event. User-provided extensions can be used to customize default display results.

20 Claims, 9 Drawing Sheets

(56) References Cited

OTHER PUBLICATIONS

Wikipedia, Visual Studio Extensibility, Wikipedia.org (Sep. 26, 2011) retrieved from http://en.wikipedia.org/w/index.php?title=Visual_Studio_Extensibility&oldid=452501475 on Mar. 6, 2015.*

Qiu, Xinyang, "New JavaScript editing features for Web development in Visual Studio 11 Developer Preview", Retrieved at <<http://blogs.msdn.com/b/webdevtools/archive/2011/09/15/new-javascript-editing-features-for-web-development-in-visual-studio-11-developer-preview.aspx>>, Retrieved Date: Sep. 15, 2011, pp. 8.

"Code Assistance in the NetBeans IDE Java Editor: A Reference Guide", Retrieved at <<http://netbeans.org/kb/docs/java/editor-codereference.html>>, Retrieved Date: Dec. 20, 2011, pp. 16.

"Writing and Editing Source Code", Retrieved at <<http://developer.apple.com/library/mac/#documentation/ToolsLanguages/Conceptual/Xcode4UserGuide/Editing/Editing.html>>, Retrieved Date: Dec. 20, 2011, pp. 15.

"Tips and Tricks (JDT)", Retrieved at <<http://help.eclipse.org/indigo/index.jsp?topic=%2Forg.eclipse.jdt.doc.user%2Ftips%2Fjdt_tips.html>>, Retrieved Date: Dec. 20, 2011, pp. 56.

"Introduction to Ajax for PHP Web Applications", Retrieved at <<http://netbeans.org/kb/docs/php/ajax-quickstart.html>>, Retrieved Date: Dec. 20, 2011, pp. 21.

* cited by examiner

Removing completion entries

```
if (VSIntellisenseExtensions) {
  VSIntellisenseExtensions.addCompletionHandler(
    function (context, completions) {
       for(var i = 0; i<completions.items.length; i++) {
          var item = completions.items[i];
          if(item.name[0] == '_') {
                completions.splice(i, 1);
          }
       }
    });
} var x = { _num1: 2, _num2: 2, num3: 'a' };
x.| // Should not have _num1, _num2 in the completion list
```

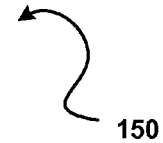

FIG. 1c

Adding new completion entries

```
if (VSIntellisenseExtensions) {
  VSIntellisenseExtensions.addCompletionHandler (
    function (context, completions) {
         if(isMyEnum(context.target)) {
              completions.push({
           name: "MyEnumValue1",
           displayText: "MyEnumValue1",
           insertionText: "MyEnumValue1",
           kind: "field",
           completionHint: {
              scope: "member",
              type: "Number",
              description: "MyEnumValue1 description"
           }
         });
         // All fields except name are optional
              completions.push({ name: "MyEnumValue2" }
         }
     });
}
```

FIG. 1d

Disable completion for certain types

```
if (VSIntellisenseExtensions) {
  VSIntellisenseExtensions.addCompletionHandler (
     function (context, completions) {
          if(disableCompletion(context)) completions.items.length = 0;
     });
}
```

⤴ 170

Modifying parameter help

FIG. 1e

```
if (VSIntellisenseExtensions) {
  VSIntellisenseExtensions.addFunctionHelpHandler(
     function (context, functionHelp) {
        var functionSrc = context.target.toString();
          var parentFuncSrc = context.target.parent.toString();

// Parse functionSrc, parentFuncSrc to get custom doc comments
        functionHelp.functionName = "newFunctionName";
        // Remove existing signature
        functionHelp.signatures.splice(0, 1);
        // Add a new signature
        functionHelp.signatures.push({
           description: "new signature description",
           returnType: "return type from doc comments",
           returnValueDescription: "signature description",
           parameters: [
              { name: "param1", type: "Param type", description: "description" },
              { name: "param2" }
           ]
        });
     });
}
```

Disabling parameter help for specific functions

```
if (VSIntellisenseExtensions) {
    VSIntellisenseExtensions.addFunctionHelpHandler (
        function (context, functionHelp) {
            if(disableParameterHelp(context))
                functionHelp.signatures.length = 0;
        });
}
```

Modifying quick info results

```
if (VSIntellisenseExtensions) {
    VSIntellisenseExtensions.addQuickInfoHandler(
        function (context, symbolHelp) {
            if(typeof context.target == "Function") {
                symbolHelp.functionHelp.signature[0].description = "description"
            }
        });
}
```

```
var library1 = {
  member1: 0,
  member2: function(a,b) { return a+b; }
};

Extension code:

// Call annotate editor API to annotate library1 members
VSIntellisenseExtensions.annotate(library1, {
    /// <field type='Number'>member1 summary</field>
    member1: undefined,
    member2: function() {
        /// <summary>adds two numbers</summary>
        /// <param name='a' type='Number'>a param summary</param>
        /// <param name='b' type='Number'>b param summary</param>
        /// <returns type='Number'/>
    }
});
```

197

FIG. 1i

EXTENSIBLE MECHANISM FOR PROVIDING SUGGESTIONS IN A SOURCE CODE EDITOR

BACKGROUND

A dynamic programming language is one that at runtime executes behaviors that a static language typically either does not perform at all or performs during compilation. The behaviors executed at runtime by a dynamic language can include extension of the program by adding new code, extension of the program by extending objects and definitions, or by modifying the type system. In a dynamic programming language, information not available at compile time can significantly alter how the program executes. For example, in a static program, when a variable is declared in the source code, the declaration specifies the type of the variable: variable x is an integer, or variable x is a string, etc. If variable x is an integer, adding x to an integer constant will invoke an arithmetic add. If variable x is a string, adding x to a constant that is a string will invoke a concatenation of the constant and x. In a dynamic programming language, the type of the variable is not known until the program executes, so additional code paths are needed to handle the different types of add operations, adding overhead to program execution.

Examples of languages generally considered to be dynamic languages include but are not limited to: ActionScript, BASIC, BeanShell, ColdFusion, Common Lisp and some other Lisp languages, Groovy, E programming languages; JavaScript, VBScript, MATLAB, Lua, Objective-C, Perl, PHP, Powershell, Python, Ruby, Smalltalk, Tcl and Dolphin Smalltalk.

SUMMARY

An extensible editor for editing program source code can customize editor suggestions comprising a collection of one or more entries using source code-specific extension code associated with program source code loaded into the extensible editor. The extension code can be provided by a third party. The extension code can reside in the source code file to which it applies. The extension code can reside in a separate file from the file in which the source code resides. A naming convention can be used to enable the extensible editor to locate the extension code. The extension code can be written in the same programming language as is the source code. The extension code can be written in a different programming language than the source code. Completion list items can be filtered, added, removed, or modified using an application programming interface (API) provided by the extensible editor. The API can allow the extension code to register for one or more events including but not limited to a completion hint event, a completion list event, and a function help event. User-provided extension code can be used to customize default completion list results, completion hint information and/or function help information.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

In the drawings:

FIG. 1c illustrates a first usage example 150 for removing completion list entries in accordance with aspects of the subject matter disclosed herein;

FIG. 1d illustrates a second usage example 160 for adding completion list entries in accordance with aspects of the subject matter disclosed herein;

FIG. 1e illustrates a third usage example 170 for filtering out completion list entries in accordance with aspects of the subject matter disclosed herein;

FIG. 1f illustrates a fourth usage example 180 for modifying parameter help in accordance with aspects of the subject matter disclosed herein;

FIG. 1g illustrates a fifth usage example 190 for filtering out parameter help in accordance with aspects of the subject matter disclosed herein;

FIG. 1h illustrates a sixth usage example 195 for modifying completion list entries in accordance with aspects of the subject matter disclosed herein;

FIG. 1i illustrates a seventh usage example 197 for providing a descriptive annotation of an entry in the modified default completion list in accordance with aspects of the subject matter disclosed herein;

DETAILED DESCRIPTION

Overview

Figure 1A:
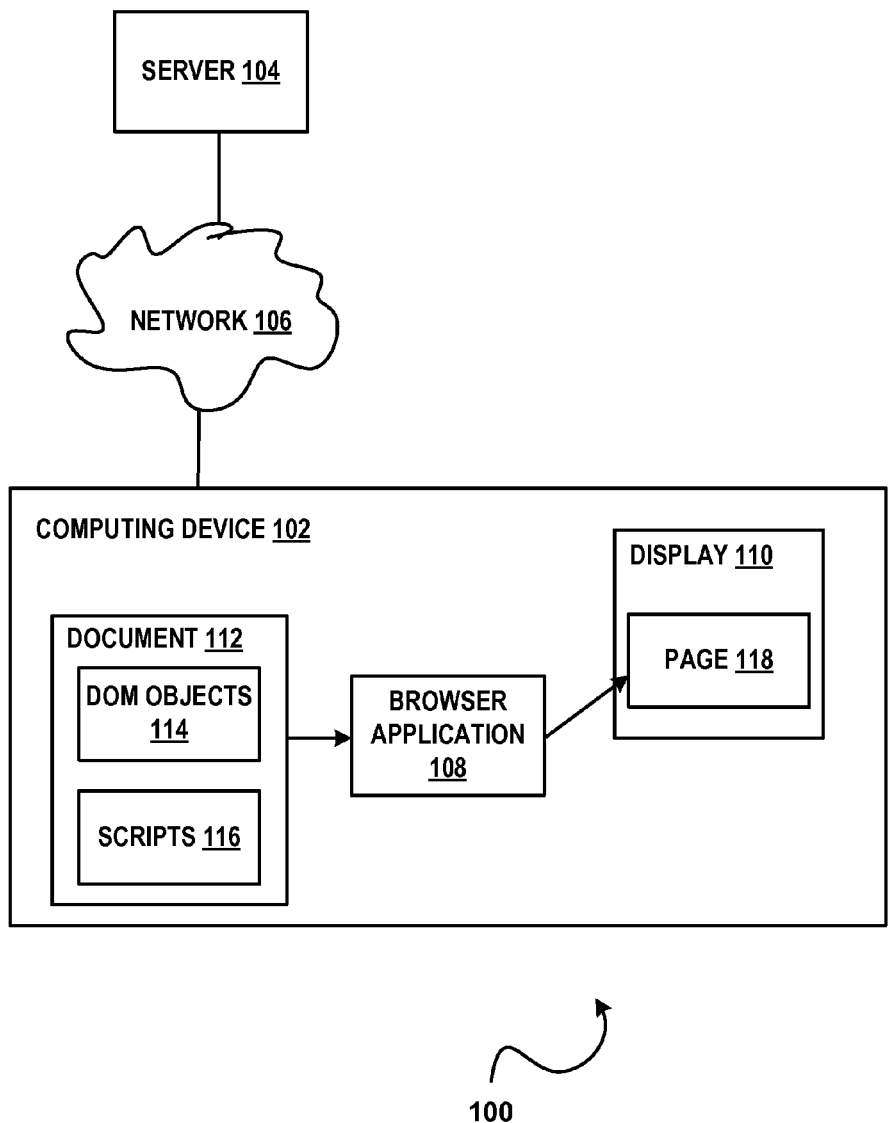
FIG. 1a illustrates an example of a web browsing environment 100 that includes a browser application configured to render pages from received documents in accordance with aspects of the subject matter disclosed herein.

A source code editor as described herein is able to provide suggestions for user selection as a software developer inputs source code. For example, a completion list function such as a member completion feature can display a list of object members when a user enters the object name. For example, suppose an object "point" is defined as:

var point={x:0, y:0};

Suppose that a user types:

point.

When the user types the dot following the object name, a completion list showing the members of the "point" object may be shown. That is, a member completion feature may display:

x y

A completion list feature can display a list of variables, functions, or arguments that are valid in the scope. A list of keywords can also be displayed. A completion list display can be automatically triggered by typing a character. The completion list display can be requested explicitly, (for example, by typing Ctrl-Space in Microsoft Corporation's Visual Studio®).

For example for the following:

```
function foo( ) { }
function bar(arg1) {
<user requests completion list explicitly here>
}
```

The completion list feature may display "foo", "arg1", and all the global object properties and keywords.

A source code editor as described herein can include a function help feature. A function help feature may be triggered when a user inputs a call to a function. The function help may be displayed when a triggering character such as opening bracket (e.g., "(" ) is input.

For the following function:

```
function add(one, two) {
/// <summary>adds two numbers</summary>
/// <param name="one" type="Number">first arg</param>
/// <param name="two" type="Number">second arg</param>
/// <returns type="Number"/>
    return one + two;
}
``` when the user inputs a call to the "add" function, the following information can be displayed when user types the call opening bracket:

Number add(Number one, Number two)
adds two numbers
one: first arg

A source code editor as described herein can include a completion hint feature. A completion hint can comprise information that describes what an entry is, (e.g., the entry is a method, a field, etc.), what the type of the item is, (e.g., the item is a number, string, object, function, etc.). A completion hint can show summary text for an item, its lexical scope (global, local, argument, etc.) and so on.

For dynamic languages the suggestions provided may include names of variables, functions and arguments valid in the scope, language keywords, or a list of object members. The suggestions are typically displayed as a list from which a user can select an entry. For example, a completion list entry may represent a global variable, a local variable, a function, a function argument, an object member, or a keyword. A user can highlight any list entry to get more information (e.g., to trigger display of a completion hint). A completion hint may include function help information when an entry is a function. Highlighting an entry may return information concerning the nature of the entry, such as: the highlighted entry is a function or the highlighted entry is a variable, etc. Highlighting an entry that is a variable or an argument can return the runtime type of the variable or argument. Highlighting a function can return function signature help and so on.

Dynamic languages including but not limited to JavaScript are typically not strongly typed. Some source code editors that operate within an integrated development environment determine type information for dynamic languages by executing the code (e.g., in the background) and checking the runtime type of the variable or argument as the program executes. Type information and human readable descriptive annotations can also be specified for variables, fields, functions and arguments via documentation comments in the source code. This information can also be displayed to the user as part of the displayed suggestions. Traditionally, the logic that populates a display with suggestions does not provide source-specific information. That is, the information provided uses programming language features rather than particular aspects of the source file being edited or referenced, such as author conventions and concepts.

In accordance with aspects of the subject matter disclosed herein, user-provided extension code can be used to customize default display results including but not limited to: completion list results, completion hint results and/or function help results. The extension code can be written in a dynamic programming language such as but not limited to JavaScript or can be written in any other programming language. The extension code may reside in the same source file to which it applies. The extension code may reside in a separate file than the file in which the source code resides. The extension code may use an extensibility application programming interface (API) implemented by the IDE. The extension code can filter displayed items based on item name, kind (field, function, variable, etc.), runtime type, or runtime value. The extension code can add, remove or modify display entries. Displayed icons can be added, removed or modified in the display for different types of entries. Extension code may change an entry icon. The type and description information that is displayed to the user can be modified. The API can be implemented in the dynamic language in which the source code is written (e.g., the source code file and the extension file can be written in the same programming language such as dynamic scripting languages such as but not limited to JavaScript). In some cases, the extension code does not need to be installed. For example, extension code can be added to a project in the integrated development environment (IDE) as files with specified extensions (e.g., as .js files). Extension code can reside in a directory in which an IDE looks for extension files. When the source code file and the extension code are written in the same language, the developer does not need to learn a new programming language to take advantage of the extension capabilities.

One example of a source-specific aspect of the source code concerns the way particular members or variables are prevented from appearing in a display. Some programming languages including but not limited to JavaScript, do not provide built-in access control support. That is, there is no concept of private and public entities in the JavaScript language. Commonly, by developer-decided convention, members that are private are prefixed with an underscore or some other prefix such as a dollar sign. Because conventions between different libraries, code modules, projects, applications, etc. differ, to prevent members considered private from appearing in the completion list, source-specific logic can be applied.

Another example of a source-specific aspect of the source code is using type information and human readable descriptive annotations provided as comments in a library-specific format. Currently there is no single standard for annotating variables, fields, arguments and functions with type and description information in a particular format. Known IDEs support an XML format for annotations but other commonly used annotations such as but not limited to JSDoc are also known.

An example of a library-specific concept concerns displaying an icon adjacent to a display entry to reflect its classification such as function, field, variable, argument, etc.). Some libraries utilize higher level concepts such as "classes", "components", etc., which are not part of the programming language in which the source code is written.

Extension code can provide completion list, completion hint and function help information based on data retrieved from a network by the extension code. For example, extension code associated with a particular library may access a Web Server where an XML file including annotation information resides. The retrieved data can be used to populate a completion list, completion hint or function help display.

It will be appreciated that while described within the context of a dynamic programming language, the subject matter described herein is applicable to any programming language whether dynamic or static, strongly or weakly typed.

Extensible Mechanism for Providing Suggestions in a Source Code Editor

FIG. 1a illustrates a web browsing environment 100, in accordance with some aspects of the subject matter disclosed herein. As shown in FIG. 1a, web browsing environment 100 can include one or more of: a computing device 102, a server 104, a network 106 and a browser application 108. Web browsing environment 100 may include other components known in the arts.

Computing device 102 can be any type of stationary or mobile computing device, including a desktop computer (e.g., a personal computer, etc.), a mobile computer or computing device (e.g., a Palm® device, a RIM Blackberry® device, a personal digital assistant (PDA), a laptop computer, a notebook computer, a tablet computer (e.g., an Apple iPad™), a netbook, etc.), a mobile phone (e.g., a cell phone, a smart phone such as an Apple iPhone, a Google Android™ phone, a Microsoft Windows® phone, etc.), or other type of mobile device. Server 104 may be implemented in one or more computer systems, including one or more servers, which may be any type of computing device described herein or otherwise known that is capable of enabling the corresponding functionality described herein.

Computing device 102 and server 104 can be communicatively coupled by network 106. Network 106 can include one or more communication links and/or communication networks, such as a PAN (personal area network), a LAN (local area network), a WAN (wide area network), or a combination of networks, such as the Internet. Computing device 102 and server 104 may be communicatively coupled to network 106 using various links, including wired and/or wireless links, such as IEEE 802.11 wireless LAN (WLAN) wireless links, Worldwide Interoperability for Microwave Access (WiMAX) links, cellular network links, wireless personal area network (PAN) links (e.g., Bluetooth™ links), Ethernet links, USB links, etc.

Browser application 108 can be a program that can execute on computing device 102. Browser application 108 can enable network information resources to be retrieved, presented, and traversed. An information resource or object can be retrieved by browser application 108 using a network address, such as a uniform resource identifier (URI). Examples of information resources include web pages, images, videos, and other forms of content. Hyperlinks that are present in information resources enable users easily to navigate their browsers to related resources. Examples of browser application 108 include Internet Explorer®, developed by Microsoft Corp. of Redmond, Wash., Mozilla Firefox®, developed by Mozilla Corp. of Mountain View, Calif., Safari®, developed by Apple Inc. of Cupertino, Calif., and Google® Chrome of Mountain View, Calif.

Browser application 108 can retrieve a document 112 from a server 104 through network 106. Document 112 can be a web document that includes code of a markup language, such as Hyper Text Markup Language (HTML), dynamic HTML (DHTML), extensible HTML (XHTML), extensible markup language (XML), etc. Document 112 can include DOM (document object model) objects 114 and one or more scripts 116. DOM objects 114 can include one or more objects represented in document 112 according to the DOM convention, which is a cross-platform and language-independent convention for representing and interacting with objects. DOM objects 114 may include objects that are directly included in document 112, and/or are referenced by document 112 and separately retrieved from server 104 or other server. Script(s) 116 include code formatted according to a dynamic language (e.g., JavaScript, VBScript, AJAX, Python, Perl, etc.) that enables changes to be made to DOM objects 114, including changes based on factors such as user input, environmental conditions (e.g., the time of day, or other variables), etc. The code of script(s) 116 can access and modify objects of DOM objects 114 on the fly without returning to server 104.

Browser application 108 can receive (e.g., load) document 112. Browser application 108 can include a browser engine (e.g., a layout engine or rendering engine) that formats information of document 112, and displays the formatted information. For example, as shown in FIG. 1a, browser application 108 can generate a page 118 based on document 112 that is displayed by a display 110 of computing device 102. Browser application 108 can be configured to execute one or more scripts 116 that are embedded in document 112, or separate from but associated with document 112.

Figure 1B:
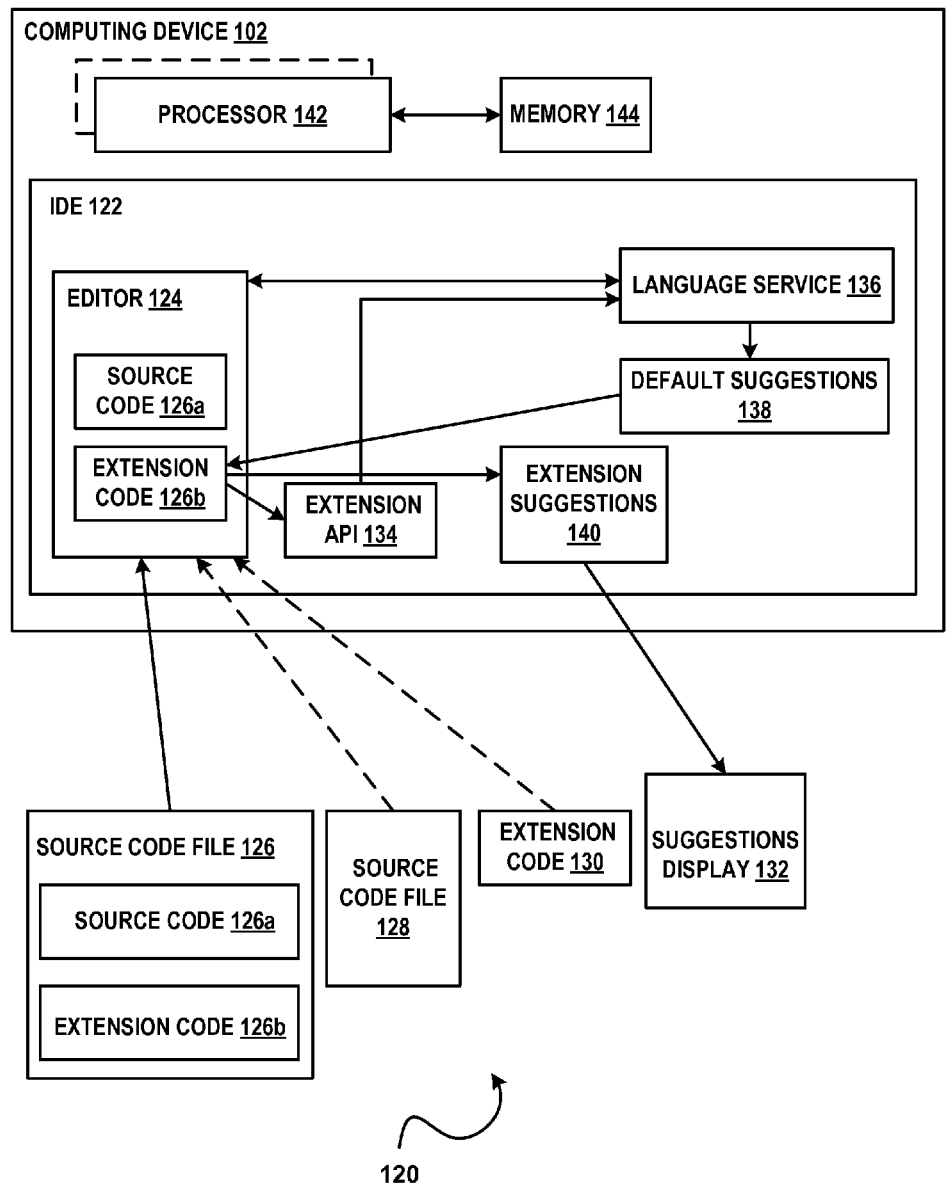
FIG. 1b illustrates an example of a system 120 comprising an extensible editor for editing source code in accordance with aspects of the subject matter disclosed herein.

FIG. 1b illustrates a block diagram of a system 120 that provides an extensible programming source code editor, according to some aspects of the subject matter disclosed herein. All or portions of system 120 may reside on one or more computers such as the computers described below with respect to FIG. 3. System 120 or portions thereof may be provided as a stand-alone system or as a plug-in or add-in. System 120 may execute on a software development computer such as the software development computer described with respect to FIG. 4. System 120 may execute within an integrated development environment (IDE) such as IDE 122, described more fully with respect to FIG. 4 or can execute outside an IDE. All or portions of system 120 may be implemented as a plug-in or add-on.

System 120 may include one or more computing devices or computers such as computing device 102 including one or more processors such as processor 142, etc., a memory such as memory 144, and one or more modules comprising an extensible program source code editor such as extensible program source code editor 124 as described herein. It will be appreciated that one or more modules such as extensible program source code editor 124, etc. can be loaded into memory 144 to cause one or more processors such as processor 142, etc. to perform the actions attributed to the one extensible program source code editor 124. Other components well known in the arts may also be included in system 120 but are not here shown.

Extensible program source code editor 124 can be a source code editor for a static or dynamic programming language. Extensible program source code editor 124 can be a source code editor for a strongly or weakly typed programming language. Extensible program source code editor 124 can be but is not limited to being a script editor. Extensible program source code editor 124 can be but is not limited to being an editor for a language that is not compiled. Extensible program source code editor 124 can be but is not limited to being a JavaScript editor.

Extensible program source code editor 124 can receive a program source code file such as source code file 128 and a corresponding program source code extension file such as extension code 130. The corresponding program source code extension file can include extension program source code. Extensible program source code editor 124 can receive a program source code file such as source code file 126 that includes program source code such as source code 126a and extension code such as extension code 126b. Extensible program source code editor 124 can implement an application programming interface (API) such as extension API 134 to which extension code can apply to subscribe to events. The events to which the extension code can apply and include but are not limited to: a display completion list event, a display completion hint event and a display function help event.

Suggestions may be provided to a user as a user edits or enters program source code in the extensible program source code editor 124. The suggestions provided may be in the form of function help. The suggestions provided may be in the form of completion hints. The suggestions provided may be in the form of an automatic completion list or an autocomplete function (e.g., such as but not limited to Microsoft Corporation's Intellisense®) in which the editor provides suggestions for completing a word or phrase that the user wants to enter without the user actually typing the word or phrase in completely. For example, a list of previously defined variables, a list of previously defined functions, a list of applicable arguments and so on can be displayed. The information provided by the autocomplete function may be based on an execution model. The information provided by the autocomplete function may be based on information available at compilation time. The information provided by the autocomplete function may be based on analysis of the abstract syntax tree of the source code loaded into the editor corresponding to a user location or any combination thereof.

While default suggestions are often quite accurate, there can be situations in which the default suggestions leave something to be desired. For dynamic languages, for example, because of the execution-based nature of some language services, traditional display results for libraries including third-party libraries can be misleading, incomplete or include items that should not be included. Sometimes, the language service cannot derive the information it needs to provide display results because of the runtime behavior of the language.

One such scenario occurs when the run-time behavior of the library inhibits the ability of the language service to provide results because a library wraps a user-defined function in another function that does not have the same statically-defined signature, preventing the suggestion providing feature from showing the expected parameters.

An example of when this scenario can occur is when, for example, a programming language (e.g., JavaScript) lacks the concept of classes. A class-emulating library can be written in a programming language that lacks the concept of a class. An outer, generic wrapping function can be written that returns a result from an inner, wrapped function whose arguments represents the type of the class using a parameter. The suggestion providing function will not show the appropriate parameter (for the inner, wrapped function) because the outer function in which the class-emulating function is wrapped, does not have a parameter. The author of the nested function can provide the parameter for the inner function by providing extension code that displays the parameter for the inner function.

Another scenario can occur when a library includes an event where calling the event's event handler may result in relevant display results but the event is not triggered before the point at which the display is requested. In this case, the execution code can trigger the event so that the relevant display results are included in the display. Another scenario can occur when a library includes throttling or timing behavior that is available at run-time but that prevents the language service from being able to retrieve the structural type information needed to provide more complete information. The extension code can include logic that disregards time components at design time and returns the function as if it were not wrapped in the throttle. The execution code can replace one function with another function. Extension code does not necessitate using an editor-implemented API in this scenario.

Sometimes, the language service cannot derive the information it needs because the context available at runtime cannot be predicted. One such scenario can occur when a library allows a function definition to be passed as an argument to one of its functions. When a suggestion display is requested within the user-defined function, the values for the function or any of the function's parameters are not available. In this case, the expected values for a function and its parameters may not be provided. An extension can be written that points the function to a different function at runtime. Extension code does not necessitate using an editor-implemented API in this scenario.

Another scenario can occur when the library includes semantics that the language service is not aware of that would be useful to expose to consumers through the display. Examples of this scenario include a library that includes members that are not meant to be exposed to users. Some programming languages such as but not limited to JavaScript do not include the concept of public and private entities preventing the language service from filtering out entries in the display. A second example can occur when a library includes or creates objects that can be accompanied by a glyph or icon. The glyph or icon can be a customized entity. The glyph can override information. For example, the name of a function object may be accompanied by a class icon because that is how a user typically perceives it.

Another scenario can occur when the library's API would benefit from user-provided documentation but annotating the API is difficult. Sometimes it is problematic to include comments in library code because the person who provides the comments or annotations is not the person who develops or owns the library and therefore cannot add comments annotations to the library code. It may be undesirable to add comments to library code because it increases the library size and as a result increases download time and execution time. Another example can be a library that defines members using an approach that is not supported by the language service. For example, in some known language services, comments are only parsed when they appear in a certain location with respect to service-supported entities. The extension code can provide the user the opportunity to provide additional comments and documentation. The extension code can provide the user an opportunity to read the annotations which the language service does not support or understand, and provide a more complete completion hint and/or function help information based on the annotations.

In accordance with some aspects of the subject matter disclosed herein, the language service providing suggestions is unaware of user-specific, source-specific, library/application/project-specific concepts. For example, some programming languages such as but not limited to JavaScript do not provide built-in access control. In languages in which there is no built-in access control, there is no concept of public and private entities. For example, each field of an object is treated as a public field. Consequently, each field of the object will appear in a suggestion display. A user may by individual convention indicate that an entity is private, by preceding the name or identifier with a particular character or series of characters such as dollar sign ("$"), underscore ("_"), "private" or the like but these personal conventions will not be respected by the language service, which will still display the private entities because the concept of private and public entities is not a feature of the programming language. A user's preference may be to have these private entities filtered out from the display but the language service cannot respect these changes because the convention is not standardized across the universe of all developers.

In accordance with some aspects of the subject matter disclosed herein, the extension code can filter out the user-designated private entities from the suggestions display. The extension code can tell the language service and editor how to hide private entities by implementing extension code. The extension code can remove entries from the display. The extension code can add entries to the display. The extension code can change entries in the display.

A semantic meaning of entities displayed can include concepts that are not part of the programming language. For example, the JavaScript script language does not include the concept of "component" or "class". The semantic meaning of the entities may be a higher level concept that those appreciated by the programming language in which the source code or source code extension code is written. The semantic meaning of the entities can be library or application-specific. The semantic meaning of the entities can be indicated by indicators such as but not limited to icons, etc. Information concerning these language-independent concepts can be provided by the extension code by displaying the indicator in the suggestions display. These indicators can be filtered, added, changed or removed by the extension code.

The extensible program source code editor 124 can implement an extension API 134. The extension code can apply to this API to subscribe to events such as but not limited to show completion list, show completion hint and show function help. In response to subscribing to an event, the default contents (e.g., default suggestions 138 generated by a language service such as language service 136) can be returned to the extension code loaded into the extensible program source code editor 124. The default list can include a collection of list entries. An event can be fired to notify the extension code that a default display has been received by the editor. "Firing an event" means to call all event handlers which are registered to that event. The extension code can then change the contents of the display by providing additional extension suggestions, changing suggestion entries, removing suggestion entries and so on (cumulatively extension suggestions 140). For each item, the extension code can provide an event handler which provides or modifies the information that is displayed in completion lists, completion hints, function help, etc. displayed by the editor. The content of this descriptive information can be changed in the extension code based on information known because of an application-specific convention. For example, summary text can be obtained from a language service or other source and the summary text can be displayed. The edited information can provide more information about the displayed information. Thus the information that is displayed to the user (e.g., suggestions display 132, which can be displayed on a display device of the computing device 102) can provide domain-specific information that is not based on characteristics of the programming language but instead is based on the user's particular source code. A higher-level semantic can be exposed to the user.

The contents of comments in the code can be provided in a display 132 as a completion hint. Additional documentation (comment) formats can be supported, including XML, and JSDoc, and so on.

FIG. 1c illustrates code for a first usage example 150 for removing completion list entries in accordance with aspects of the subject matter disclosed herein. FIG. 1d illustrates code for a second usage example 160 for adding completion list entries in accordance with aspects of the subject matter disclosed herein. FIG. 1e illustrates code for a third usage example 170 for filtering out completion list entries in accordance with aspects of the subject matter disclosed herein. FIG. 1f illustrates code for a fourth usage example 180 for modifying parameter help in accordance with aspects of the subject matter disclosed herein. FIG. 1g illustrates code for a fifth usage example 190 for filtering out parameter help in accordance with aspects of the subject matter disclosed herein. FIG. 1h illustrates code for a six usage example 195 for modifying completion list entries in accordance with aspects of the subject matter disclosed herein. FIG. 1i illustrates code for a seventh usage example 197 for providing a descriptive annotation of an entry in the modified default completion list in accordance with aspects of the subject matter disclosed herein.

Figure 2:
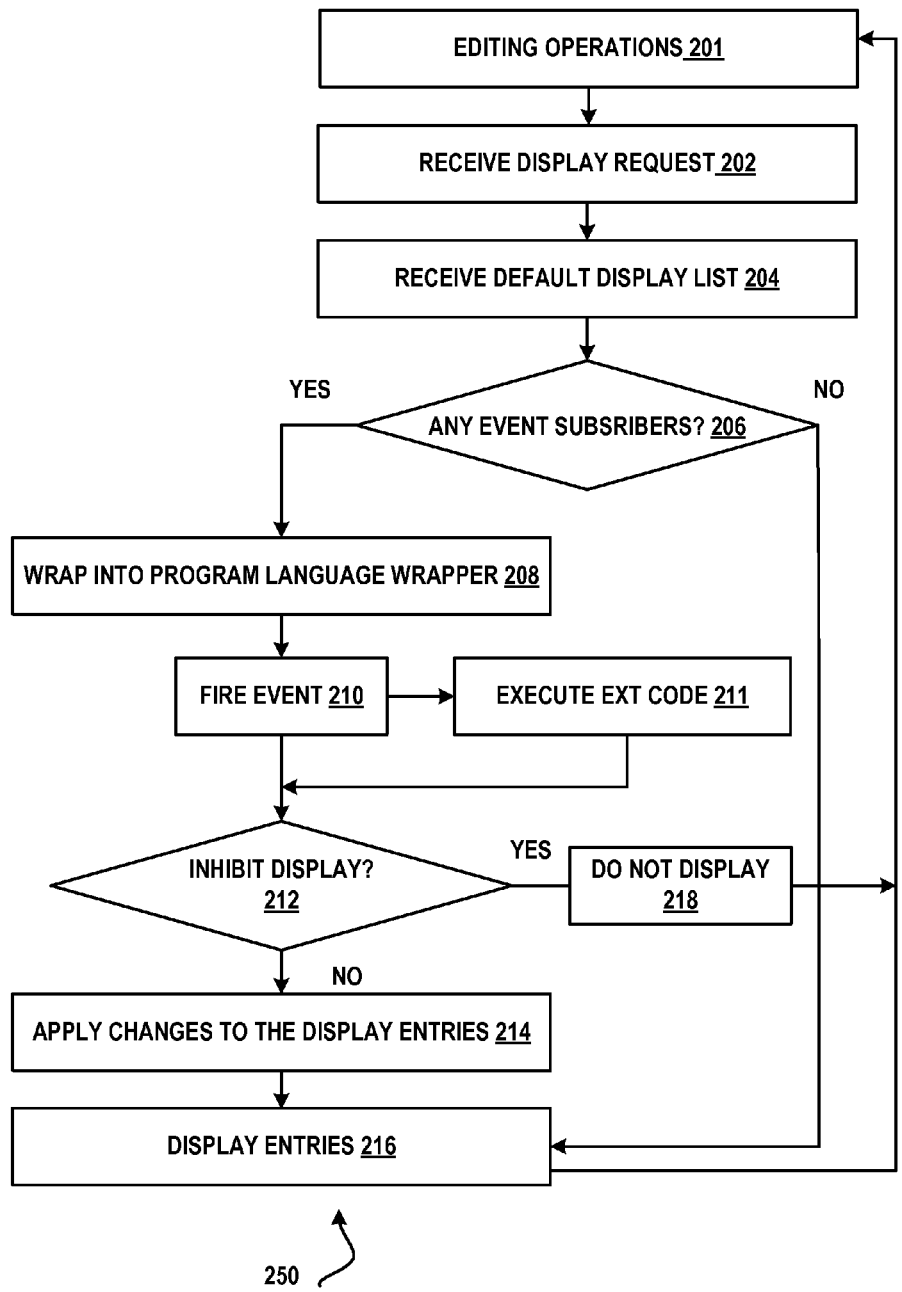
FIG. 2 illustrates an example of a method 250 for providing suggestions in a source code editor using source code-specific extension code associated with program source code in accordance with aspects of the subject matter disclosed herein.

FIG. 2 illustrates a method 250 that can provide suggestions in a source code editor using source code-specific extension code associated with program source code in accordance with aspects of the subject matter disclosed herein. The method described in FIG. 2 can be practiced by a system such as but not limited to the ones described with respect to FIG. 1a and FIG. 1b. While method 250 describes a series of acts that are performed in a sequence, it is to be understood that method 250 is not limited by the order of the sequence. For instance, some acts may occur in a different order than that described. In addition, an act may occur concurrently with another act. In some instances, not all acts may be performed.

At 201 editing operations in an extensible source code editor may occur. At 202 a function can be initiated within the extensible editor, as described more fully above. The function requested can be a completion list, function help or completion hint function. Such a request can be initiated by a user inputting some character or series of characters followed by a particular character (e.g., a dot ".") that triggers the request. The request can be made explicitly via UI (menu command) or via a keyboard shortcut. Any typed character may trigger display of a completion list as the user types. For example, if a user types "a" an auto-complete function can be triggered that shows all available items in the scope that begin with "a".

The request can be sent to a language service. At 204 the language service can return a default display to the extensible editor. The default display can include items discernible from features of the programming language. At 206 the extensible editor can determine if there are any extensions that apply to the default completion list, by, for example, checking to see if there are any event subscribers to events including but not limited to show completion list, function help and completion hint. If there are no event subscribers, the default display can be displayed on a display device of the computer or computing device at 216. At 208, if the programming language in which the extension code is written is based on an object model, the default display results can be wrapped into an object model of the appropriate programming language, (e.g., JavaScript). At 210 the default display results can be sent to the extension code associated with the part of the code in which the request was triggered by firing an appropriate event. At 211 the extension code associated with the request can be executed. At 212 the extension code may determine that the editor should not display the results (218) and processing may resume normal editing operations at 201. If the extension code determines at 212 that the results are to be displayed, the extension code involved with the interaction can apply changes as described more fully above to the default display at 214. The potentially modified display can be displayed at 216. Processing can resume with normal editing functions at 201.

Example of a Suitable Computing Environment

Figure 3:
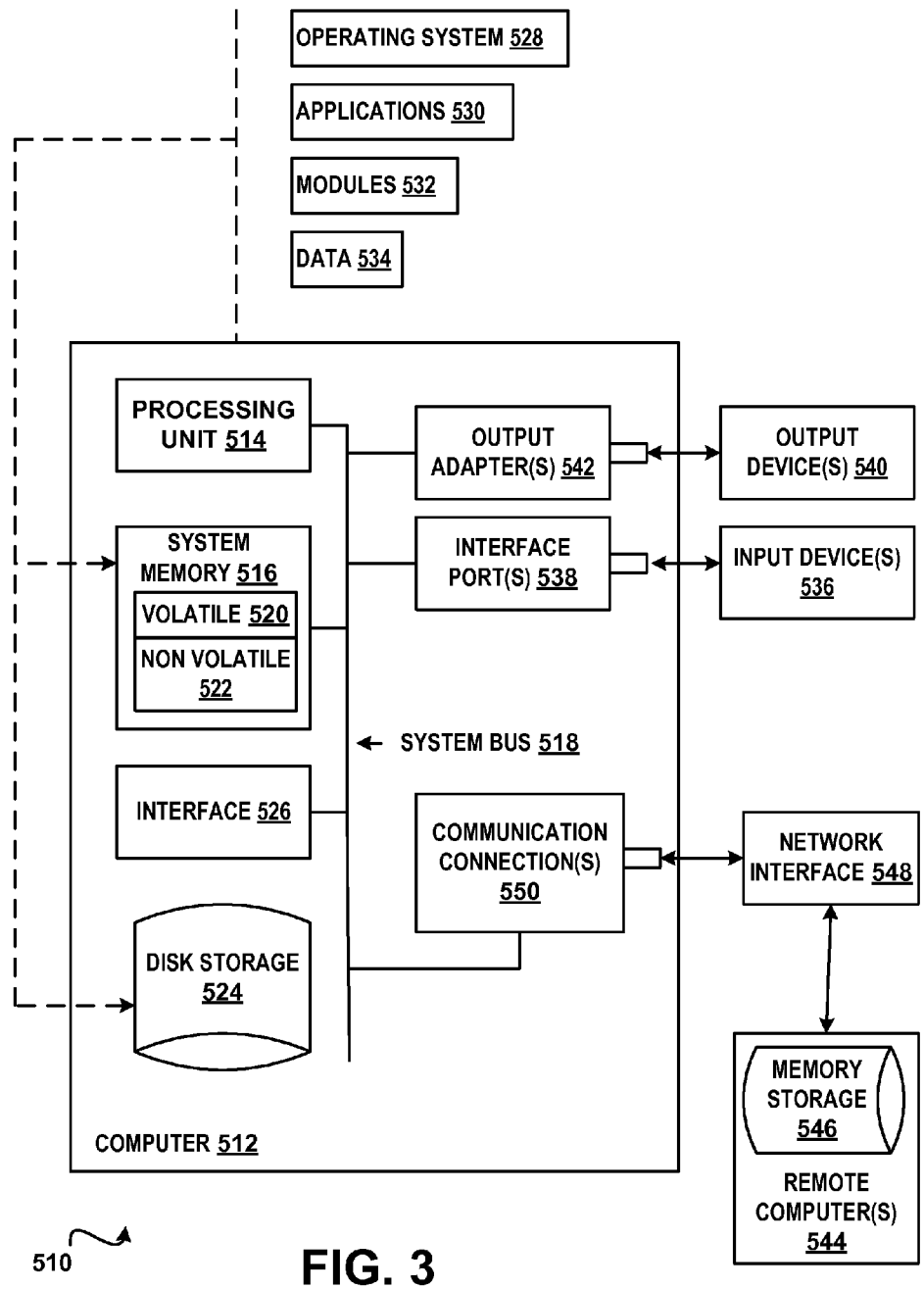
FIG. 3 is a block diagram of an example of a computing environment in accordance with aspects of the subject matter disclosed herein.

In order to provide context for various aspects of the subject matter disclosed herein, FIG. 3 and the following discussion are intended to provide a brief general description of a suitable computing environment 510 in which various embodiments of the subject matter disclosed herein may be implemented. While the subject matter disclosed herein is described in the general context of computer-executable instructions, such as program modules, executed by one or more computers or other computing devices, those skilled in the art will recognize that portions of the subject matter disclosed herein can also be implemented in combination with other program modules and/or a combination of hardware and software. Generally, program modules include routines, programs, objects, physical artifacts, data structures, etc. that perform particular tasks or implement particular data types. Typically, the functionality of the program modules may be combined or distributed as desired in various embodiments. The computing environment 510 is only one example of a suitable operating environment and is not intended to limit the scope of use or functionality of the subject matter disclosed herein.

With reference to FIG. 3, a computing device in the form of a computer 512 is described. Computer 512 may include at least one processing unit 514, a system memory 516, and a system bus 518. The at least one processing unit 514 can execute instructions that are stored in a memory such as but not limited to system memory 516. The processing unit 514 can be any of various available processors. For example, the processing unit 514 can be a GPU. The instructions can be instructions for implementing functionality carried out by one or more components or modules discussed above or instructions for implementing one or more of the methods described above. Dual microprocessors and other multiprocessor architectures also can be employed as the processing unit 514. The computer 512 may be used in a system that supports rendering graphics on a display screen. In another example, at least a portion of the computing device can be used in a system that comprises a graphical processing unit. The system memory 516 may include volatile memory 520 and nonvolatile memory 522. Nonvolatile memory 522 can include read only memory (ROM), programmable ROM (PROM), electrically programmable ROM (EPROM) or flash memory. Volatile memory 520 may include random access memory (RAM) which may act as external cache memory. The system bus 518 couples system physical artifacts including the system memory 516 to the processing unit 514. The system bus 518 can be any of several types including a memory bus, memory controller, peripheral bus, external bus, or local bus and may use any variety of available bus architectures. Computer 512 may include a data store accessible by the processing unit 514 by way of the system bus 518. The data store may include executable instructions, 3D models, materials, textures and so on for graphics rendering.

Computer 512 typically includes a variety of computer readable media such as volatile and nonvolatile media, removable and non-removable media. Computer storage media may be implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other transitory or non-transitory medium which can be used to store the desired information and which can be accessed by computer 512.

It will be appreciated that FIG. 3 describes software that can act as an intermediary between users and computer resources. This software may include an operating system 528 which can be stored on disk storage 524, and which can allocate resources of the computer 512. Disk storage 524 may be a hard disk drive connected to the system bus 518 through a non-removable memory interface such as interface 526. System applications 530 take advantage of the management of resources by operating system 528 through program modules 532 and program data 534 stored either in system memory 516 or on disk storage 524. It will be appreciated that computers can be implemented with various operating systems or combinations of operating systems.

A user can enter commands or information into the computer 512 through an input device(s) 536. Input devices 536 include but are not limited to a pointing device such as a mouse, trackball, stylus, touch pad, keyboard, microphone, voice and gesture input systems and the like. These and other input devices connect to the processing unit 514 through the system bus 518 via interface port(s) 538. An interface port(s) 538 may represent a serial port, parallel port, universal serial bus (USB) and the like. Output devices(s) 540 may use the same type of ports as do the input devices. Output adapter 542 is provided to illustrate that there are some output devices 540 like monitors, speakers and printers that require particular adapters. Output adapters 542 include but are not limited to video and sound cards that provide a connection between the output device 540 and the system bus 518. Other devices and/or systems or devices such as remote computer(s) 544 may provide both input and output capabilities.

Computer 512 can operate in a networked environment using logical connections to one or more remote computers, such as a remote computer(s) 544. The remote computer 544 can be a personal computer, a server, a router, a network PC, a peer device or other common network node, and typically includes many or all of the elements described above relative to the computer 512, although only a memory storage device 546 has been illustrated in FIG. 3. Remote computer(s) 544 can be logically connected via communication connection(s) 550. Network interface 548 encompasses communication networks such as local area networks (LANs) and wide area networks (WANs) but may also include other networks. Communication connection(s) 550 refers to the hardware/software employed to connect the network interface 548 to the bus 518. Communication connection(s) 550 may be internal to or external to computer 512 and include internal and external technologies such as modems (telephone, cable, DSL and wireless) and ISDN adapters, Ethernet cards and so on.

It will be appreciated that the network connections shown are examples only and other means of establishing a communications link between the computers may be used. One of ordinary skill in the art can appreciate that a computer 512 or other client device can be deployed as part of a computer network. In this regard, the subject matter disclosed herein may pertain to any computer system having any number of memory or storage units, and any number of applications and processes occurring across any number of storage units or volumes. Aspects of the subject matter disclosed herein may apply to an environment with server computers and client computers deployed in a network environment, having remote or local storage. Aspects of the subject matter disclosed herein may also apply to a standalone computing device, having programming language functionality, interpretation and execution capabilities.

Figure 4:
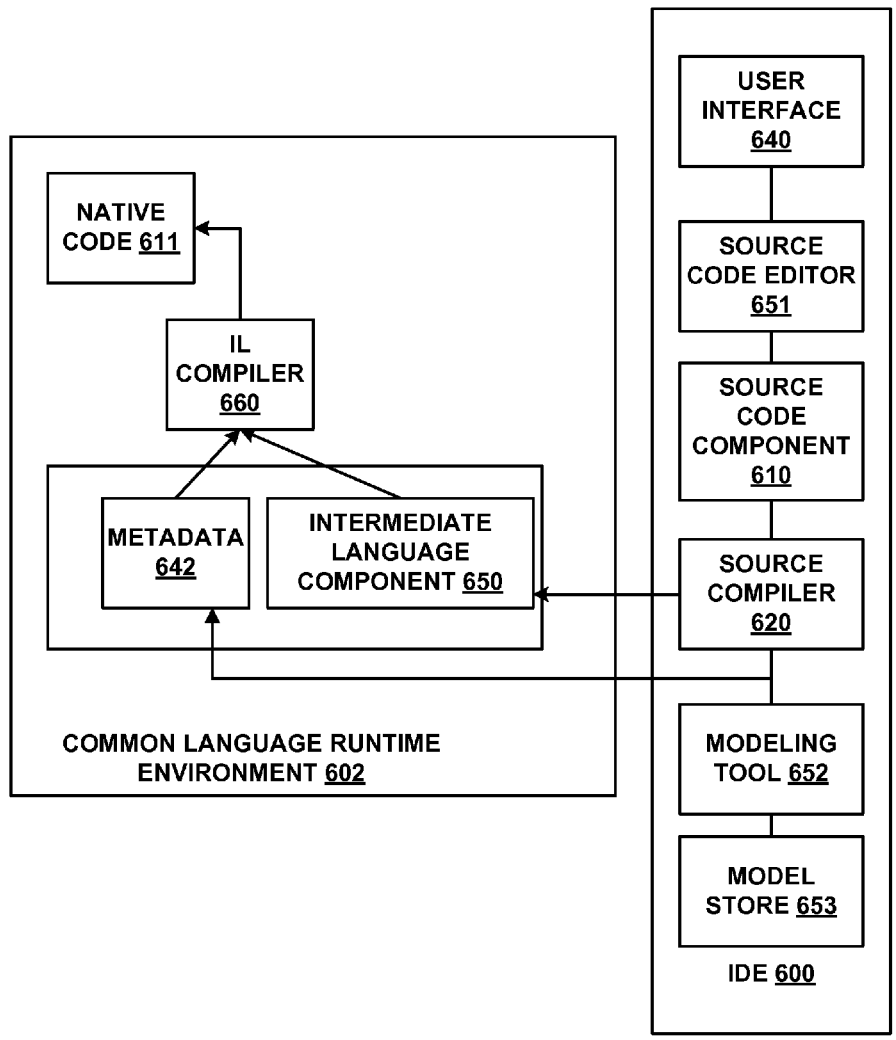
FIG. 4 is a block diagram of an example of an integrated development environment (IDE) in accordance with aspects of the subject matter disclosed herein.

FIG. 4 illustrates an integrated development environment (IDE) 600 and Common Language Runtime Environment 602. An IDE 600 may allow a user (e.g., developer, programmer, designer, coder, etc.) to design, code, compile, test, run, edit, debug or build a program, set of programs, web sites, web applications, and web services in a computer system. Software programs can include source code (component 610), created in one or more source code languages (e.g., Visual Basic, Visual J#, C++. C#, J#, Java Script, APL, COBOL, Pascal, Eiffel, Haskell, M L, Oberon, Perl, Python, Scheme, Smalltalk and the like). The IDE 600 may provide a native code development environment or may provide a managed code development that runs on a virtual machine or may provide a combination thereof. The IDE 600 may provide a managed code development environment using the .NET framework. An intermediate language component 650 may be created from the source code component 610 and the native code component 611 using a language specific source compiler 620 using a modeling tool 652 and model store 653 and the native code component 611 (e.g., machine executable instructions) is created from the intermediate language component 650 using the intermediate language compiler 660 (e.g. just-in-time (JIT) compiler), when the application is executed. That is, when an IL application is executed, it is compiled while being executed into the appropriate machine language for the platform it is being executed on, thereby making code portable across several platforms. Alternatively, in other embodiments, programs may be compiled to native code machine language (not shown) appropriate for its intended platform.

A user can create and/or edit the source code component according to known software programming techniques and the specific logical and syntactical rules associated with a particular source language via a user interface 640 and a source code editor 651 in the IDE 600. Thereafter, the source code component 610 can be compiled via a source compiler 620, whereby an intermediate language representation of the program may be created, such as assembly 630. The assembly 630 may comprise the intermediate language component 650 and metadata 642. Application designs may be able to be validated before deployment.

The various techniques described herein may be implemented in connection with hardware or software or, where appropriate, with a combination of both. Thus, the methods and apparatus described herein, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing aspects of the subject matter disclosed herein. As used herein, the term "machine-readable medium" shall be taken to exclude any mechanism that provides (i.e., stores and/or transmits) any form of propagated signals. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects, e.g., through the use of a data processing API or the like, may be implemented in a high level procedural or object oriented programming language to communicate with a computer system. However, the program(s) can be implemented in assembly or machine language, if desired. In any case, the language may be a compiled or interpreted language, and combined with hardware implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:
1. A system comprising:
a processor;
a memory; and
a source code editor comprising at least one module loaded into the memory causing the processor to:
receive program source code to be edited;
generate an editor display using the program source code;
trigger execution of extension code based on an occurrence of an event at the editor display, the event associated with the extension code, the extension code being distinct from the program source code to be edited, the extension code loaded from an external source into the source code editor and executable by the processor to determine that the editor display is to be modified and to generate a changed editor display upon determining by the extension code that the editor display is to be modified; and
display the changed editor display generated by the execution of the extension code.
2. The system of claim 1, further comprising at least one module loaded into the memory causing the processor to provide an application programming interface associated with the source code editor to enable the extension code to register for the event.
3. The system of claim 2, the event comprising a display completion list event.
4. The system of claim 2, the event comprising a display completion hint event.
5. The system of claim 2, the event comprising a display function help event.
6. The system of claim 1, wherein the source code editor receives the extension code in a programming language in which the program source code is written.
7. The system of claim 6, wherein the programming language is a dynamic scripting language.
8. A method comprising:
generating, by a source code editor, a display of editor suggestions based on program source code to be edited, the display of editor suggestions comprising a collection of entries;
triggering, by the source code editor, execution of extension code as a result of the display of editor suggestions, wherein the extension code is distinct from the source code to be edited and is loaded from an external source into the source code editor, determining, by executing the extension code, that the display of editor suggestions is to be modified, and changing the display of editor suggestions upon determining by the extension code that the editor display is to be modified; and
displaying, by the source code editor, the changed editor display.
9. The method of claim 8, further comprising:
customizing the display of editor suggestions by adding at least one entry to the display.

10. The method of claim 8, further comprising:
customizing the display of editor suggestions by removing at least one entry from the display.

11. The method of claim 10, further comprising:
customizing the display of editor suggestions by changing at least one entry in the display.

12. The method of claim 8, wherein the display of editor suggestions includes a completion list, a completion hint or function help.

13. The method of claim 8, further comprising:
receiving the extension code in a file comprising the source code.

14. The method of claim 8, further comprising:
receiving the extension code in a first file and receiving the source code in a second file.

15. A storage device comprising computer-executable instructions which when executed cause a computing device to:
display an editor display generated by a source code editor, the editor display based on source code to be edited by the source code editor;
trigger execution of extension code based on an occurrence of an event at the editor display, the event associated with the extension code, the extension code being distinct from the source code to be edited and loaded from an external source into the source code editor and executable by the source code editor to determine that the editor display is to be modified and to generate a changed editor display; and
display, by the source code editor, the changed editor display.

16. The storage device of claim 15, comprising further computer-executable instructions, which when executed cause the computing device hide members denoted as private in the changed editor display.

17. The storage device of claim 15, comprising further computer-executable instructions, which when executed cause the computing device to provide an indicator in the changed editor display, the indicator indicating a concept not supported by a programming language in which the extension code is written.

18. The storage device of claim 15, comprising further computer-executable instructions, which when executed cause the computing device to provide a descriptive annotation of an entry in the changed editor display, the descriptive annotation provided as a comment in a source code-specific format in the source code.

19. The storage device of claim 15, comprising further computer-executable instructions, which when executed cause the computing device to use a naming convention to load the extension code into an IDE.

20. The storage device of claim 15, comprising receiving the extension code in a first file and receiving the source code in a second file.

* * * * *